US011677584B2

(12) United States Patent
Ngo et al.

(10) Patent No.: US 11,677,584 B2
(45) Date of Patent: Jun. 13, 2023

(54) APPLICATION TCP TUNNELING OVER THE PUBLIC INTERNET

(71) Applicant: DH2I COMPANY, Fort Collins, CO (US)

(72) Inventors: Thanh Q. Ngo, Oregon City, OR (US); Samuel Revitch, Portland, OR (US)

(73) Assignee: DH2I COMPANY, Fort Collins, CO (US)

( * ) Notice: Subject to any disclaimer, the term of this patent is extended or adjusted under 35 U.S.C. 154(b) by 41 days.

(21) Appl. No.: 16/903,933

(22) Filed: Jun. 17, 2020

(65) Prior Publication Data
US 2021/0105151 A1    Apr. 8, 2021

Related U.S. Application Data

(60) Provisional application No. 62/862,438, filed on Jun. 17, 2019.

(51) Int. Cl.
*H04L 12/46* (2006.01)
*H04L 9/40* (2022.01)

(52) U.S. Cl.
CPC .......... *H04L 12/4633* (2013.01); *H04L 63/08* (2013.01)

(58) Field of Classification Search
CPC ....... G01D 4/004; G06F 8/65; G06F 9/45533; G06N 5/04; G06N 20/00; H02J 13/00; H02J 2310/14; H04L 12/4633; H04L 61/1511; H04L 63/08; H04L 63/0428; H04L 63/162; H04L 63/1433; H04L 69/16; H04L 69/164
See application file for complete search history.

(56) References Cited

U.S. PATENT DOCUMENTS

| 7,992,201 | B2* | 8/2011 | Aldridge | ............. H04L 63/0272 |
| | | | | 726/14 |
| 8,020,203 | B2* | 9/2011 | Kumar | .................... H04L 69/40 |
| | | | | 709/239 |

(Continued)

FOREIGN PATENT DOCUMENTS

| EP | 3198464 A1 | 3/2016 |
| WO | 2016049609 A1 | 3/2016 |

OTHER PUBLICATIONS

Tschofenig, H., et al., "Transport Layer Security (TLS) / Datagram Transport Layer Security (DTLS) Profiles for the Internet of Things," Internet Engineering Task Force (IETF); ISSN 2070-1721; Jul. 2016 http://www.rfc-editor.org/info/rfc7925.

(Continued)

*Primary Examiner* — Walter J Divito
(74) *Attorney, Agent, or Firm* — Martensen IP; Michael C. Martensen

(57) ABSTRACT

A datagram-oriented UDP protocol is used for communication between tunnel gateways in a wide area network. Lightweight remote client accesses network services using TCP tunneling. Each remote client maintains one or more UDP/IP+DTLS communication channels to a single member of the gateway group. Gateway servers belonging to the gateway group form some interconnection topology linking each gateway server to each other gateway server, whereby each gateway server maintains a communication channel with every other gateway server in the gateway group.

19 Claims, 10 Drawing Sheets

(56) References Cited

U.S. PATENT DOCUMENTS

| | | |
|---|---|---|
| 8,234,702 B2 | 7/2012 | Maes |
| 8,843,639 B2 * | 9/2014 | Jewell .................... H04L 63/08 709/227 |
| 8,990,901 B2 | 3/2015 | Aravindakshan |
| 9,037,709 B2 | 5/2015 | Enns |
| 9,215,131 B2 | 12/2015 | Frey |
| 9,270,449 B1 * | 2/2016 | Tribble ............... H04L 63/0435 |
| 9,342,293 B2 | 5/2016 | Enns |
| 9,467,454 B2 | 10/2016 | Aravindakshan |
| 9,577,909 B2 | 2/2017 | Li |
| 9,577,927 B2 | 2/2017 | Hira |
| 9,661,005 B2 | 5/2017 | Kamble |
| 10,027,687 B2 | 7/2018 | Kamble |
| 10,284,526 B2 * | 5/2019 | Moore ................. H04L 63/302 |
| 10,348,767 B1 * | 7/2019 | Lee ..................... H04L 63/1416 |
| 10,412,048 B2 * | 9/2019 | Glazemakers ........ H04L 63/029 |
| 2003/0088698 A1 | 5/2003 | Singh |
| 2003/0188001 A1 * | 10/2003 | Eisenberg ............. H04L 69/164 709/229 |
| 2005/0163061 A1 | 7/2005 | Piercey |
| 2006/0029016 A1 | 2/2006 | Peles |
| 2006/0235939 A1 | 10/2006 | Yim |
| 2008/0072307 A1 | 3/2008 | Maes |
| 2008/0291928 A1 | 11/2008 | Tadimeti |
| 2009/0040926 A1 | 2/2009 | Li |
| 2009/0138611 A1 | 5/2009 | Miao et al. |
| 2010/0161960 A1 | 6/2010 | Sadasivan |
| 2012/0166593 A1 * | 6/2012 | Yoon ...................... H04L 67/18 709/219 |
| 2012/0226820 A1 | 9/2012 | Li |
| 2013/0133043 A1 | 5/2013 | Barkie |
| 2013/0283364 A1 | 10/2013 | Chang |
| 2013/0298201 A1 | 11/2013 | Aravindakshan |
| 2014/0200013 A1 | 7/2014 | Enns |
| 2014/0207854 A1 | 7/2014 | Enns |
| 2014/0359700 A1 * | 12/2014 | Krieger ................. H04L 63/166 726/3 |
| 2015/0026262 A1 * | 1/2015 | Chaturvedi ............. H04L 45/00 709/204 |
| 2015/0195293 A1 | 7/2015 | Kamble |
| 2015/0229649 A1 | 8/2015 | Aravindakshan |
| 2015/0381484 A1 | 12/2015 | Hira |
| 2017/0134399 A1 | 5/2017 | Kamble |
| 2017/0149548 A1 | 5/2017 | Hira |

OTHER PUBLICATIONS

PCT/US2019/045425; International Search Report and Written Opinion of the International Searching Authority; dated Oct. 24, 2019.

PCT/US2019/045431; International Search Report and the Written Opinion of the International Searching Authority dated Oct. 28, 2019.

Reardon, Joel, et al.; "Improving Tor using a TCP-over-DTLS Tunnel"; May 25, 2009; http://www.cypherpunks.ca/~iang/pubs/TorTP.pdf (15 pages).

PCT/US2019/045430; International Search Report and Written Opinion of the International Searching Authority; dated Oct. 24, 2019.

PCT/US2019/048355; International Search Report and the Written Opinion of the International Searching Authority dated Oct. 28, 2019.

Tan, J., et al.; "Optimiing Tunneled Grid Connectivity Across Firewalls"; CRPIT vol. 99, Grid Computing and e-Research 2009; Proc. 7th Australasian Symposium on Grid Computing and e-Research (AusGrid 2009), Wellington, New Zealand; pp. 21-28.

* cited by examiner

APPLICATION TCP TUNNELING OVER THE PUBLIC INTERNET

The present application relates to and claims the benefit of priority to U.S. Provisional Patent Application No. 62/862,438 filed 17 Jun. 2019 which is hereby incorporated by reference in its entirety for all purposes as if fully set forth herein.

BACKGROUND OF THE INVENTION

Field of the Invention

Embodiments of the present invention relate, in general, to Transmission Control Protocol ("TCP") connection forwarding and more particularly to forwarding application-level TCP connections between servers.

Relevant Background

TCP tunneling secures transmissions by encapsulating and encrypting packets. The Secure Shell (SSH) software application is a known technology that provides TCP tunneling functionality. SSH establishes point-to-point TCP connections between sites, and provides authentication and basic internal services, including access to a command shell and files on the server side. It can be configured to open TCP tunnels from one side to the other. To accomplish reliable and secure transmission of data, SSH use of TCP as the communication channel between the tunnel gateway components is complex. A need exists to use a simplified communication channel to tunnel TCP traffic while retaining reliability and versatility. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

One embodiment of the present invention specifies the use of the datagram-oriented UDP protocol for communication between tunnel gateways. The use of the datagram-oriented UDP protocol rather than TCP as the transport, which would arguably simplify the design, is chosen for at least two reasons:
  Endpoint discovery on NAT routers is substantially more reliable using UDP
  UDP allows for more accurate assessment of liveness of peers, as every message received from a peer is processed by a component of the invention, whereas with TCP, the host networking stack will not inform the application of any message that does not contain the next unreceived data block.

The present invention, accordingly, specifies the use of a single UDP port for all styles of communication between servers, as well as with an endpoint registry server. This supports the goal of reliable endpoint discovery.

The invention is capable of facilitating direct communication between two servers in situations where one server sits behind a symmetric NAT, as long as the other server does not also sit behind a symmetric NAT. This is enabled by bidirectional attempts to initiate communication, where the outbound attempt from the server behind the non-symmetric NAT may be blocked by the symmetric NAT, but the outbound attempt of the server behind the symmetric NAT will not be blocked by the non-symmetric NAT.

The invention additionally describes a method of statically configuring tunnels. A primary implementation of the invention is part of a high-availability application clustering software product. The high-availability clustering product manages applications that can run on any one server of the server cluster, and move between servers in response to failures. An extension is to automatically establish tunnel origins on inactive servers to support application access from any server, regardless of which server on which the application is active.

The invention is also designed to provide secure, private TCP communication between disconnected/geographical networks over untrusted networks, such as the public Internet. It provides functionality similar to a VPN, however it has greater security advantages and is more desirable. The invention can be integrated with an application management platform, to provide automatic connectivity of distributed applications across the public Internet. This can support simplified configuration of high-availability, replication, and disaster recovery features, without the need for a VPN, or any reconfiguration of the host networking stack.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
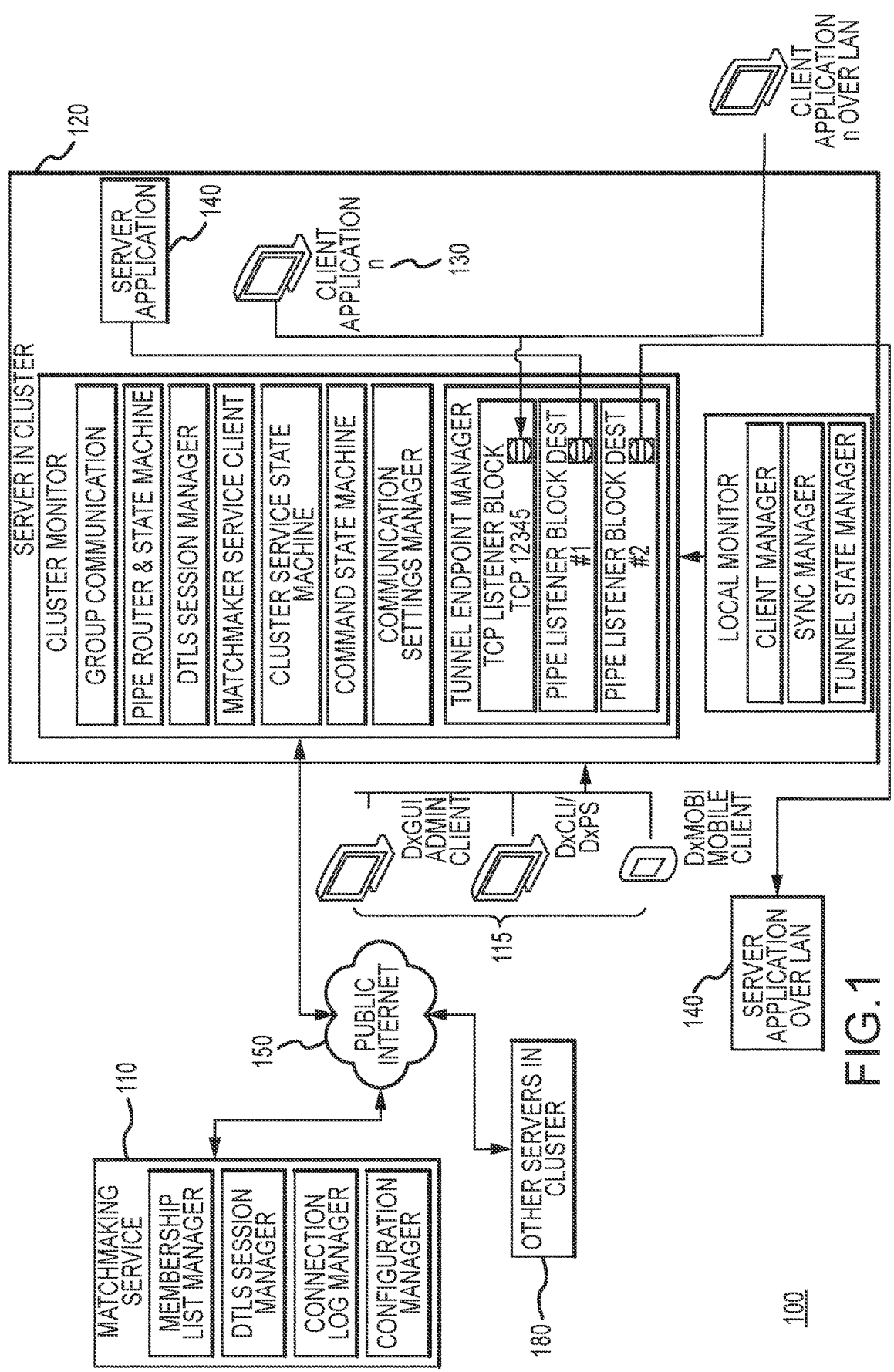
FIG. 1 is a system block diagram of a network and server internal modules/engines according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

The present invention enables TCP tunneling over the public Internet with a specialized role of the remote client. Broadly, the present invention describes a method of providing and controlling access to TCP network services to lightweight remote clients. The method provides for flexible authentication of remote clients, fine-grained access control of specific clients to TCP network services, and highly-available, fault-tolerant access to the network services.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

IP—Internet Protocol. Occupies layer-3 in the OSI model.

IPv4—Internet Protocol version 4, with a 32-bit address space

ISP—Internet Service Provider

OSI Model Open Systems Interconnection model, a standard characterization of functional layers of networking. See FIG. 1.

NAT—Network Address Translation, a technology used prolifically to connect local area networks to the public Internet Port Forwarding—A technique provided by most NAT routers to allow connections from the public Internet to an internal server TCP Transmission Control Protocol, a stream-oriented, reliable-delivery data transfer protocol used over IP. Occupies layer-4 in the OSI model.

UDP—User Datagram Protocol, an unreliable, not-necessarily-in-order datagram delivery protocol, used over IP. Occupies layer-4 in the OSI model.

GRE—Generic Routing Encapsulation, a simplified datagram-oriented protocol used by certain VPNs to exchange layer-2 or layer-3 traffic. GRE itself may be considered layer-4 in the OSI model, as it sits above layer-3 protocols, but is considered to break the layering order by containing messages from lower layers.

Host Networking Stack—The primary network state machine running on a server or any other networked computer. Typically part of the operating system kernel. Provides layer-4 socket services for TCP and UDP protocols, as well as state machines for layer-3 protocols such as IPv4/IPv6, layer-2 protocols, network hardware drivers, and virtual network drivers for VPNs.

LAN—Local area network

WAN—Wide Area Network, a network that typically connects distant sites to one another or to the public Internet VPN—Virtual Private Network. A layer-2 or layer-3 networking technology that allows local networks to be securely extended or bridged over WANs, such as the public Internet.

TLS—Transport Layer Security, method for establishing private, authenticated communication channels over stream-oriented communication channels such as TCP DTLS—Datagram Transport Layer Security, method for establishing private, authenticated communication channels over non-reliable, out-of-order datagram communication channels such as UDP Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

In the most basic example, the present invention involves five participating components, as depicted in FIG. 1.

FIG. 1 presents a component diagram 100 with remote client including one or more TCP client applications 130, each of which is running on some sort of end user device, e.g. a mobile phone, a tablet, or a desktop PC 115.

Running on the same device as one or more client applications 130, is the remote client software agent 210. The remote client 210 opens one or more listening TCP ports to which the client application 210 is able to connect, via TCP, in order to access its server application 140. The remote client device is connected to the public Internet 150, and may be connected directly or behind a NAT router 160 as depicted in FIG. 1.

An intermediary registry instance (also referred to herein as a matchmaking service). The intermediary registry 110 is used by the remote client 210 to locate gateway servers 220 in its group and establish direct communication with one of them. All active gateway servers 220 maintain contact with the intermediary registry 110, and their addresses and external port mappings can be queried by remote clients seeking to connect to a gateway server. All communication with the intermediary registry 110 is done using the UDP/IP protocol with the DTLS secure encapsulation.

One or more gateway servers 220 accept connections from remote clients 210, and mediate connectivity between remote clients and TCP network services. Gateway servers 220 are organized into gateway groups 225, and while the example above includes only one gateway server, many gateway servers can participate in the same group. A remote client 210 selects one gateway server 220 using the intermediary registry 110, establishes communication with it using UDP/IP and DTLS, and authenticates to it. The gateway server 220 is attached to the public Internet 150, and may be attached directly or behind a NAT router 160 as depicted in FIG. 1.

A TCP server application is a server application that uses the TCP protocol to interact with its clients over a network, and creates one or more TCP listening ports for clients to connect to. The invention facilitates lightweight remote client access to these network services using TCP tunneling. For each TCP connection made by client application (a) to remote client (b), a gateway server (d) will make a corresponding connection to the server application (e).

FIG. 1 presents a Gateway Server and Remote Client connection topology.

Figure 2:
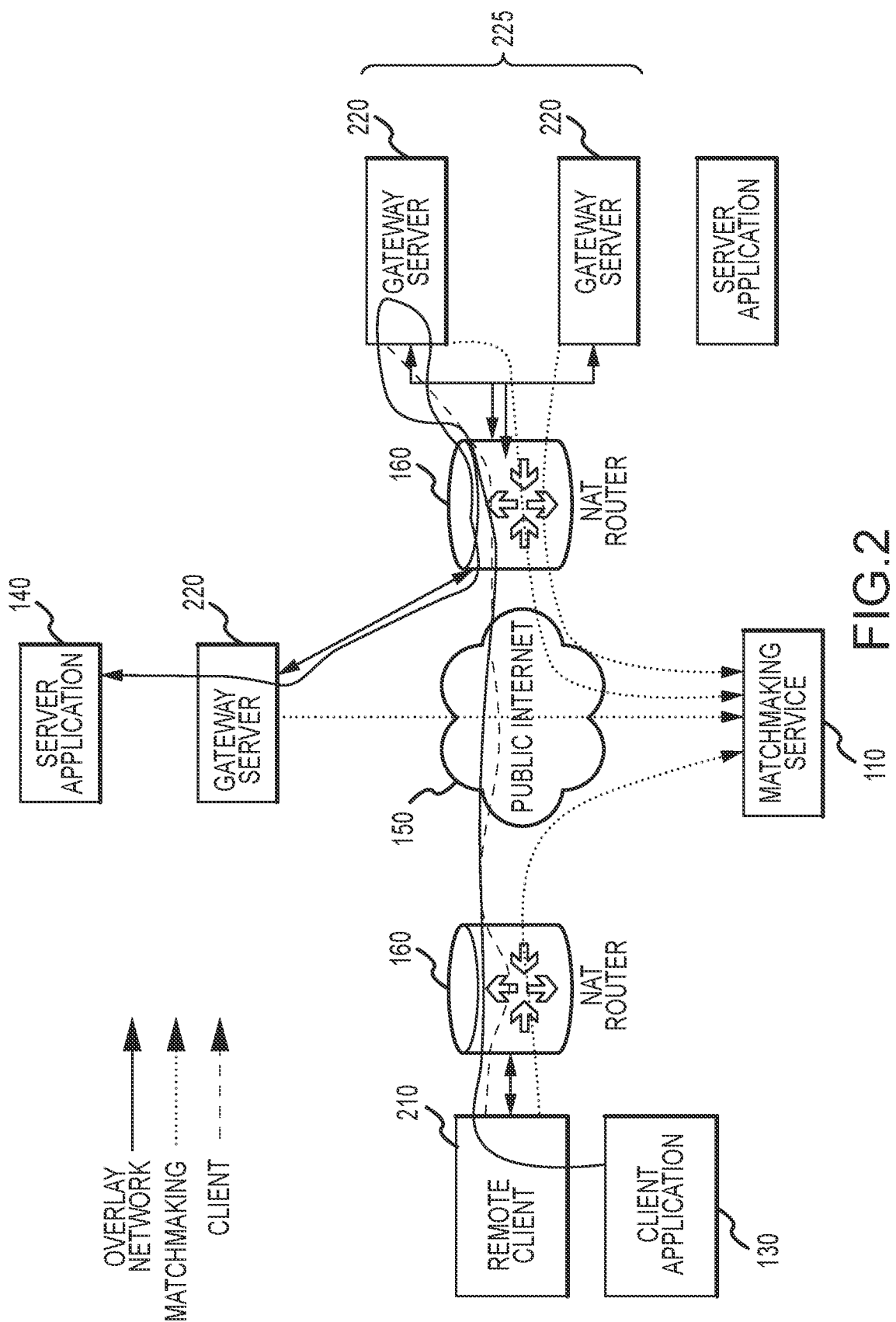
FIG. 2 presents a high level network and component diagram of a TCP application client application as it interacts with an intermediary registry according to one embodiment of the present invention.

Per FIG. 2, each remote client 210 must maintain one UDP/IP+DTLS communication channel to a single member 220 of the gateway group 225. Gateway servers 220 belonging to the gateway group 225 form some interconnection topology linking each gateway server to each other gateway server, which can be complete interconnection, where each gateway server maintains a communication channel with every other gateway server in the gateway group.

FIG. 2 presents a UDP/IP+DTLS Communication Channel Components

Figure 3:
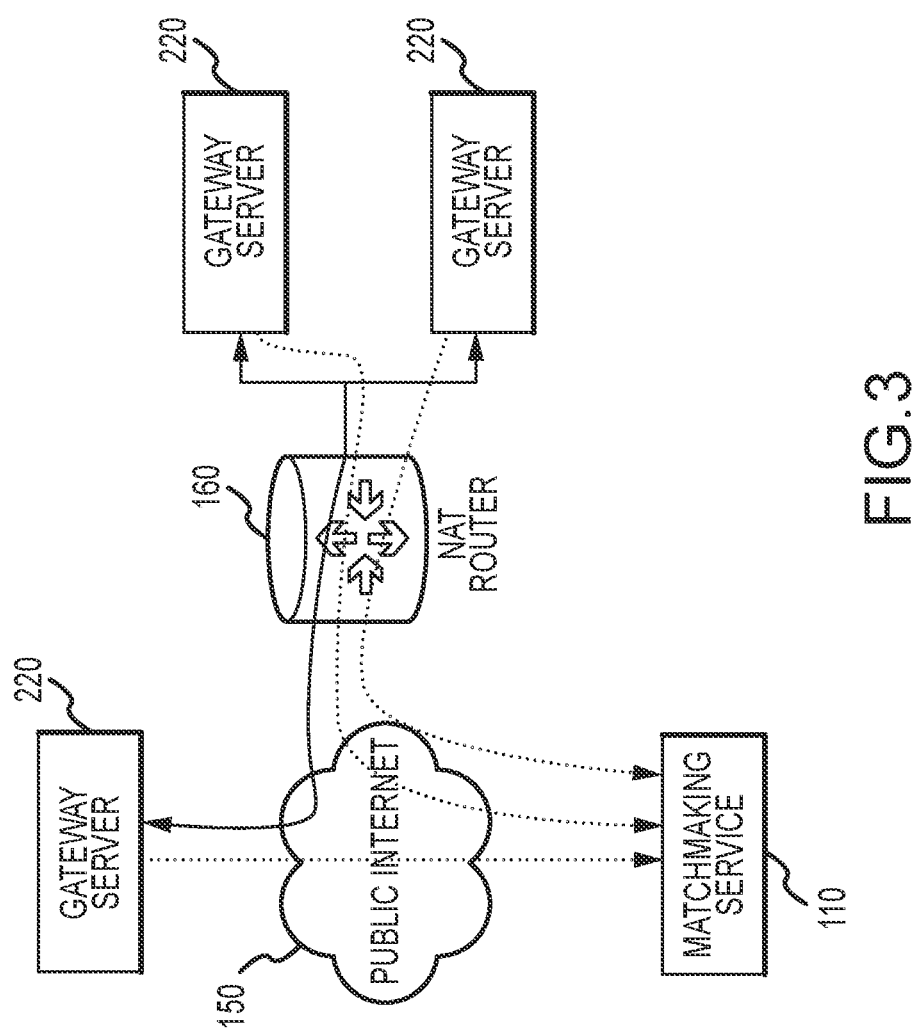
FIG. 3 presents a high level network and component diagram of gateway server interaction with an intermediary registry according to one embodiment of the present invention.

Per FIG. 3, the UDP/IP+DTLS communication channel between a remote client and a gateway server consists of a UDP/IP message channel, a DTLS encapsulation, and two types of messages sent through the encapsulation.

Datagram messages are the most basic form of communication. Datagram messages 1070 are used for authentication 1060 and for determining network liveness. Like the underlying UDP/IP transport layer, datagram messages are unreliable and subject to reordering and duplication. Datagram messages are also subject to message length limitations imposed by the underlying network, which can require fragmentation and reassembly of large messages.

Pipe messages 1030 are used to implement reliable, ordered message streams, similar to TCP. Like TCP, pipe messages are sent between socket state machines that maintain connection states, queues of inbound and outbound data, and use acknowledgments and retransmissions to ensure reliable delivery of data. Pipe messages include sender and receiver port numbers, which allow specific services and tunnels to be associated with certain listening port numbers, and allow multiple sockets to be multiplexed over a single communication channel.

The remote client and the gateway server each have a socket port map 1010 used to track the local end of each open pipe connection, as well as listening sockets. Each entry in the socket port map 1010 tracks three details:

The local pipe port number

Details of the remote host, which can be a remote gateway server, a locally connected remote client, a remotely connected remote client The remote pipe port number New sockets 1020 are created and added to the socket port map 1010 when (a) a listening pipe socket is created, (b) a connecting pipe socket is created, and (c) a listening pipe socket accepts a new connection. When a listening pipe socket is created, it is bound to a port on which it listens, and does not link to a remote host or a remote port, as it is not actually connected. When a connecting pipe socket is created, it is bound to a random unused port, and the remote host and port to which it is connected. When a new connection on a listening pipe socket is accepted, it is bound to the local listening port, and the remote host and port of the connecting pipe socket.

For each connected remote client, the gateway server also has a remote client port remap. The port remap is a lookup table which maps ports available to the remote client to a socket port map either local or on a remote gateway server. Every pipe message 1030 received from the remote client is processed through the port remap 1050, and the remote port number of the message is used to look up the redirected destination for the message.

The remote client port remap allows remote clients to be specifically authorized to use individual addresses.

When active, each gateway server maintains a communication channel with the intermediary registry. It does this to advertise its availability to remote clients searching for a gateway server. It may also do this in order to advertise its availability to other gateway servers in its gateway group, as they are potentially added or shut down and restarted and need to establish communication channels with their peers. The intermediary registry only retains records for gateway servers that check in regularly; if a gateway server remains silent for too long, it will be assumed to be unavailable and will be from the matchmaking server's list.

The remote client component takes the following steps to establish communication with a gateway server, and make tunnels available to its client application(s):

1. The remote client finds an unexplored UDP endpoint for a gateway server. This can be done:
   By searching a cache of previously-used UDP endpoint addresses
   By contacting the intermediary registry:
   i. Perform a DNS lookup of the intermediary registry, retrieve one or more IPv4 and IPv6 address(es).
   ii. Perform a DTLS handshake with the intermediary registry endpoint address.
   iii. Issue a query command to the intermediary registry to retrieve data about one member of the gateway group
2. The remote client initiates a DTLS handshake with the gateway server UDP endpoint address. If unsuccessful, go back to step (1).
3. The remote client checks whether the gateway server is trusted, based on the public key presented during DTLS handshaking. If the gateway server is not trusted, go back to step (1).
4. The remote client waits for, and responds to, the gateway server's client authentication requests. Authentication methods used here can be flexible. The gateway server may request a username and password, a token, or may simply acknowledge the client as having passed authentication based on its DTLS public key. Authentication messages are sent over the datagram message channel per FIG. 3. If authentication is ultimately unsuccessful, or times out, go back to step (1).
5. The gateway server opens pipe port 7979 to the newly authenticated remote client, and permits a connection on that port. This will be referred to as the control port, and port 7979 is the well-known port number used for the control port.
6. The remote client opens a pipe connection to port 7979 on the gateway server. This will be referred to as the control connection for the remote client.
7. Send an authorization request through the control connection, and wait for a response. As part of processing the authorization request, the gateway server will check current session counts for the authenticated user, and decide whether the remote client should be granted access to tunnels. If successful, the gateway server will map each authorized tunnel for the remote client to a pipe port. If unsuccessful, go back to step (1).
8. Send a tunnel configuration request through the control connection, and wait for a response. The response message will include a list of tunnels, each entry of the list including:
   The name of the tunnel
   The pipe port to which the tunnel is mapped
   The list of default TCP listener addresses for the tunnel
9. For each configured tunnel, the remote client will open local TCP listeners corresponding to its list of default TCP listener addresses. Each new connection opened to any of these TCP listeners results in a pipe connection to the associated pipe port assigned to the tunnel, which eventually results in a connection to the destination server application via TCP (FIGS. 1*d* & *e*).

After the remote client has completed connecting to a gateway server, it becomes ready to accept connections from client applications (FIG. 1*a*) and to forward them across to the server application.

FIG. 3 presents a Server Application co-located with gateway server.

Figure 4:
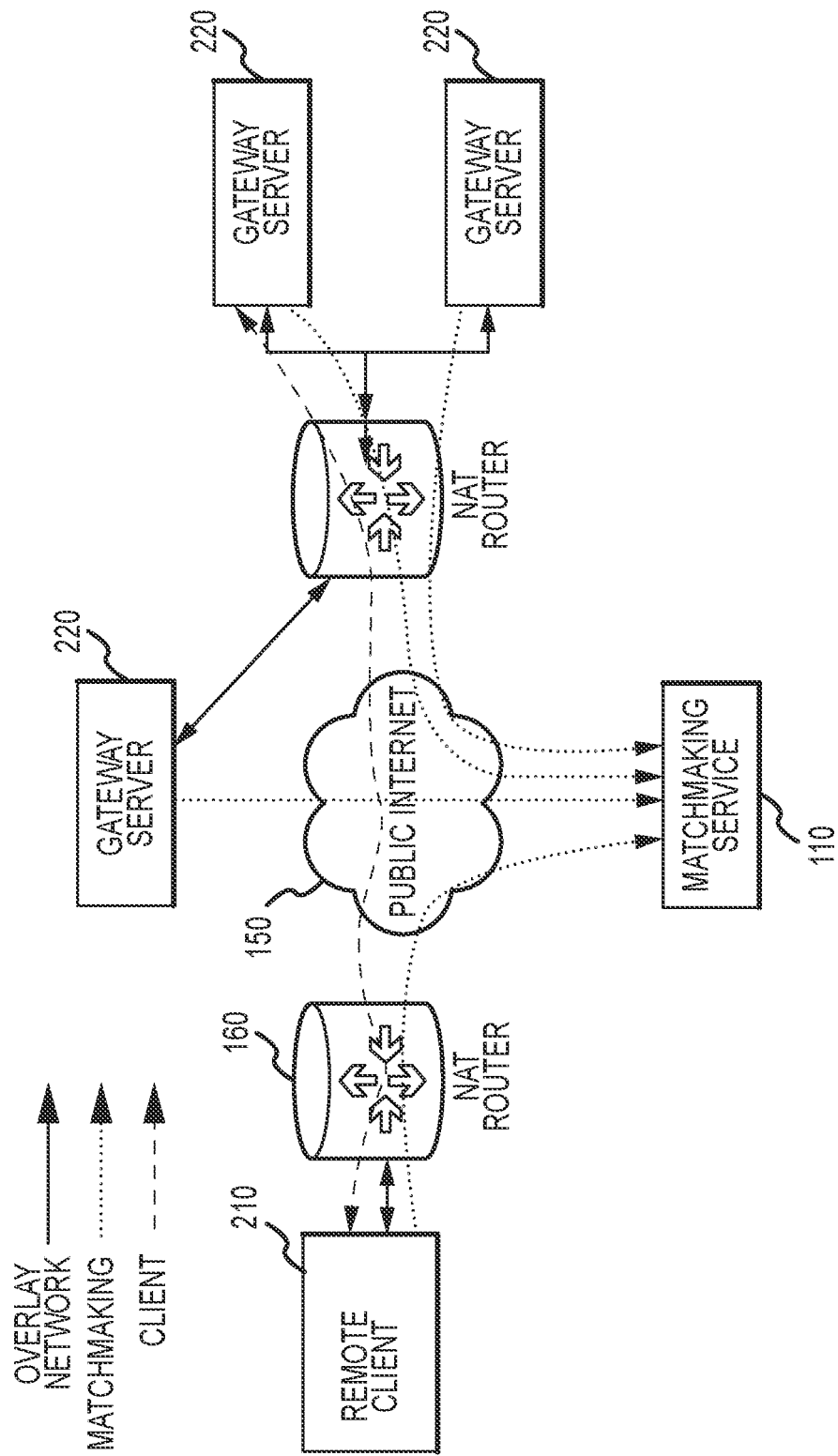
FIG. 4 presents a secondary high level network and component diagram of a TCP application client application as it interacts with an intermediary registry according to one embodiment of the present invention.

Each connection made by the client application 130 will cause the remote client 210 to initiate a pipe connection to the port configured for the tunnel. In FIG. 4, the remote client 210 has a TCP listener open on port 8080 for a tunnel called APP. The gateway server pipe port mapped to APP is 1026. In the FIG. 4 example, the client application has connected to the tunnel origin listener on TCP port 8080. The tunnel origin listener opened a pipe connection to the gateway server for the tunnel connection, for which it randomly selected local port 1024. It then connected the pipe socket to the gateway server, pipe port 1026. On the gateway server 220, the pipe port is remapped to SERVER, pipe port 1201, on which the tunnel destination is listening, and the pipe connection from the remote client has been established. To complete the tunnel connection, the tunnel destination block has opened a TCP connection to the server application. In the FIG. 4 example, the tunnel destination block resides on the same gateway server as the remote client is connected to.

FIG. 4 presents a Server Application accessed through remote gateway server.

Figure 5:
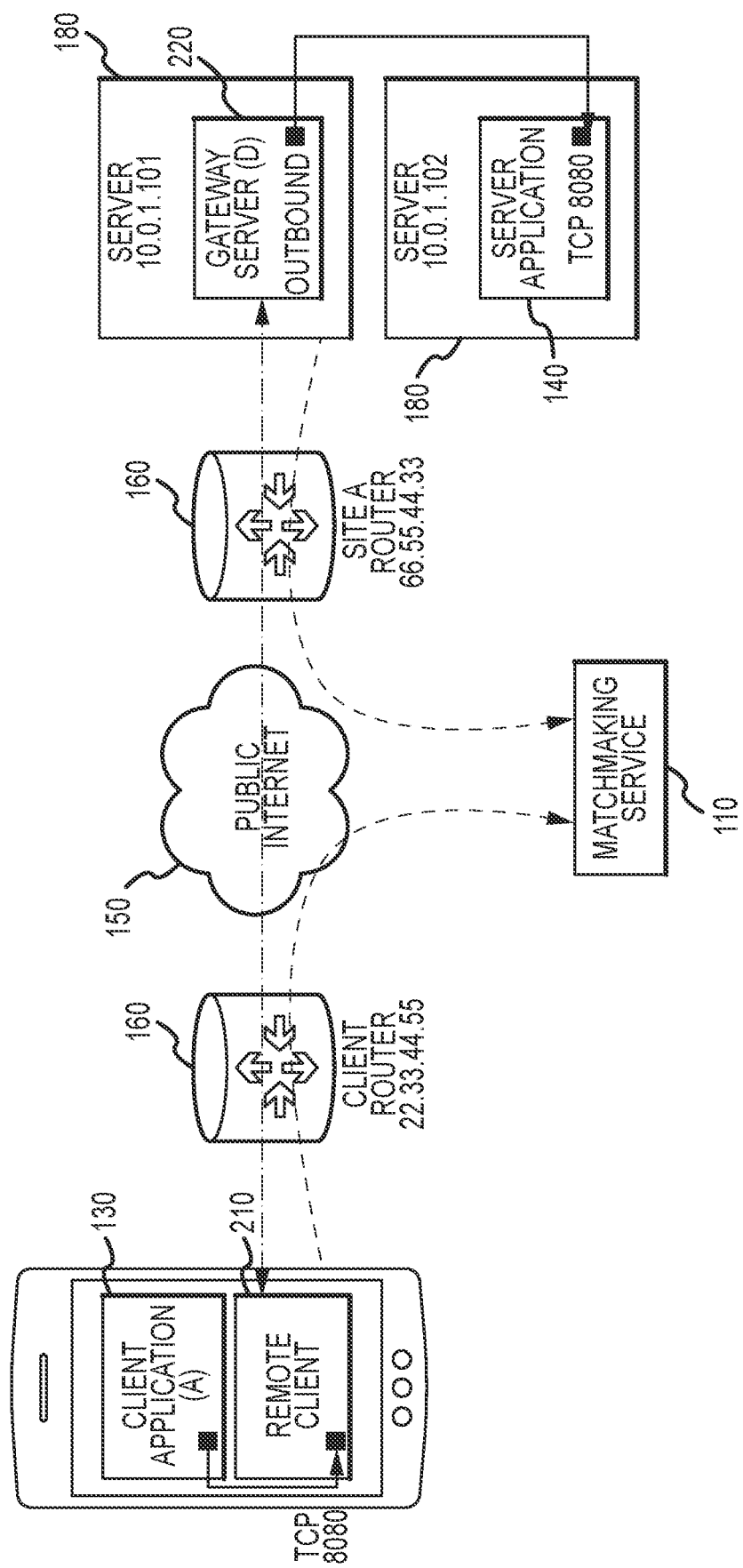
FIG. 5 presents a high level network and component diagram of a TCP application client application as it interacts with an intermediary registry showing port allocation according to one embodiment of the present invention.

In many cases, the gateway server 220 to which the remote client is connected may not have access to the server application 140. When a tunnel destination is active on a gateway server different from the one where a remote client is connected, the remote client port remap will point to the gateway server on which the tunnel destination is active, and message traffic will be forwarded to that gateway server. This situation is exemplified in FIG. 5. Pipe messages received from the remote client to port 1026 are forwarded from SERVER1 to SERVER2 over their gateway-to-gateway DTLS communication channel, and ultimately to the tunnel destination block.

The per-remote-client port remap provides isolation and virtualization of pipe ports accessible to the remote client. It allows for fine-grained authorization for access to TCP tunnels.

TABLE 1

Remote client component comparison.

| | Gateway Server | Remote Client |
|---|---|---|
| Connectivity to the Matchmaking Service | Continuous | Briefly, to make initial contact with a gateway server |
| Connectivity with Gateway Servers | Continuous contact with all other available gateway servers | Maintains contact with one gateway server only |
| Connectivity with Remote Clients | Accepts connections, does not initiate | None |
| Authentication | Public key | Flexible, username/password, OAuth, etc. |
| Authorization | Fully privileged | Tunnel access configured per user account |
| Tunnel Origins | As configured | As authorized by gateway server |
| Tunnel destinations | As configured | None |

Gateway servers 220 maintain continuous contact with the intermediary registry 110. This keeps the list of available gateway servers on the intermediary registry current, and allows gateway servers that have recently started or restarted to query for and immediately make contact with their peers in their gateway group. It also allows remote clients to query for and immediately locate available gateway servers.

Remote clients 210 make contact with the intermediary registry 110 only as needed to locate and make initial contact with available gateway servers 220.

Gateway servers 220 form a fully-connected network among their gateway group 215. Each gateway server maintains contact with every other gateway server in the gateway group.

Each remote client 210 uses the intermediary registry 110 to locate and make initial contact with one gateway server 220 of the gateway group, and maintains contact with that gateway server for the lifetime of its session. Remote clients communicate only with gateway servers, not other remote clients.

Gateway servers authenticate each other using pre-configured public key authentication. Connections between gateway servers are privileged, in the sense that when a connection is permitted, a gateway server on one side of a connection is allowed to effect reconfiguration of any or all aspects of the gateway server software on the other side. This is necessary to allow synchronization of configuration between gateway servers.

The remote client role, as depicted in FIG. 1, behaves as a TCP tunnel origin point—it opens TCP listening sockets, and accepts connections to be tunneled elsewhere via the gateway group. The destination point(s) of the tunnels accessible to a remote client are managed by the gateway group, and may reside on any active gateway server within the gateway group.

The remote client is only required to establish communication with one gateway server in a gateway group in order to access all resources provided by the gateway group. While a gateway server maintains communication with all other gateway servers in the group, the remote client need only establish communication with one gateway server in order to access all resources. To support this, the gateway servers form an overlay network.

The present invention (as shown in FIG. 3) consists of the following components:

Cluster Monitor—responsible for establishing communication of all available servers participating in the tunnel gateway network, monitoring server availability, providing virtual synchrony through its coordinator, monitoring and synchronizing the state of attached service processes (Cluster Services), relaying commands between Cluster Service members, and maintaining tunnel endpoints. As the invention makes it possible and valuable to build networks of more than two tunnel gateway servers, the group of tunnel gateway servers will be referred to as a cluster, and the primary networking component, the Cluster Monitor. To the Cluster Monitor, a Cluster Service is an external software component participating in a named group. The Cluster Monitor informs all Cluster Services participating in the same group of each other's presence, and any changes that may occur to that group. The Local Monitor component functions as a Cluster Service.

Group Communication—establishing communication with all available servers involved in the cluster, monitoring server availability and communication channels, and electing a server as the cluster coordinator.

Pipe Router and State Machine—Provides reliable, in-order stream-oriented messaging channels, over the unreliable, out-of-order, datagram-oriented UDP communication channel. Manages pipe sockets, both listening sockets and outgoing connections. The communication channels provided by this module are used by the Tunnel Endpoint Manager to establish new tunnel sessions and to exchange data on existing sessions. It is also used internally by other Cluster Monitor components to communicate with other servers. The pipe state machine is similar to the TCP module found in most host networking stacks, and performs largely the same function. However, the invention calls for a private TCP-like software component within the Cluster Monitor component.

DTLS session manager—responsible for establishing authenticated DTLS sessions with other servers in the cluster over UDP Intermediary registry client—manages communication with the intermediary registry, including NAT configuration discovery, group registrations, and invitations Cluster Service State Machine—monitoring availability of Cluster Services, processing changes to the set of available Cluster Services, and informing active Cluster Service components running on each system of the current service membership.

Command State Machine—monitoring the state of relay commands submitted by various Cluster Services. Ensuring consistent ordering of relayed commands, and the reliability of responses are sent back to the issuers of those commands.

Communication Settings Manager—maintains administratively configured details of the cluster, including the list of systems, their network addresses, and cryptographic secrets. Managing the process of adding and removing systems in an active cluster.

Tunnel Endpoint Manager—responsible for creating, altering, or removing tunnel redirector endpoints based on global configuration. The Tunnel Endpoint Manager ensures that the tunnel configuration is synchronized between servers, processes updates to the global tunnel configuration, and manages two different types of tunnel endpoints:

TCP Listener Block—Listens on a TCP socket. For each newly accepted connection, the TCP Listener Block will initiate a pipe connection to a preconfigured address. Upon successful connection, all data received from the accepted TCP socket will be forwarded to the pipe socket, and vice versa.

Pipe Listener Block—Listens on a pipe socket. For each newly accepted connection, the pipe listener block will initiate a TCP connection to a preconfigured address. Upon successful connection, all data received from the accepted pipe socket will be forwarded to the TCP socket, and vice versa.

Intermediary registry

Membership List Manager—maintains list of known servers that are in contact, the groups they claim to belong to, and informs other servers of the same group of changes to the group. Also handles invitation requests for cluster formation and the addition of new servers.

DTLS session manager—responsible for establishing DTLS sessions with servers acting as clients. Not used for authentication, but for nominal message privacy Connection log manager—if enabled, maintains a log of which servers have been in contact, when contact is established, and when contact is lost. Used for potential metering and billing purposes Configuration manager—maintains configuration of the intermediary registry, including which addresses it should be listening on, and a server blacklist Local Monitor—The Local Monitor maintains configuration state for tunnels, and provides an administrative interface.

Client Manager—handling incoming client requests, passing the requests to the Application Coordinator, and maintaining client connections.

Sync Manager—maintaining administrative configuration of virtual hosts and applications. Synchronizing configuration between systems as cluster membership changes.

Application Coordinator—executing administrative commands, and synchronizing tunnel configuration with the Cluster Monitor. This component is responsible for maintaining the configuration, which describes a list of tunnels to be maintained across the cluster.

Client Application, Server Application—The invention supports the operation of TCP tunnels for use by these applications. TCP tunnels allow these applications to connect to one another through incongruent networks, such as across NAT routers, without opening access to the public Internet.

In addition to servicing TCP connection tunnels, the ordered, reliable communication channels provided by the Pipe Router and State Machine are necessary for components internal to the Cluster Monitor, such as the Cluster Service State Machine and the Command State Machine. A Pipe Router communication channel is used to send commands to other servers in the cluster, to send responses back to command issuers, and to synchronize configuration.

An entry in the Application Coordinator's tunnel configuration table contains:

Destination gateway name—Cluster member that will operate the destination tunnel gateway Destination target address and port—Host to which the destination gateway will establish new tunnel connections One or more origins, including:
  a. Origin gateway name—Cluster member that will operate the origin tunnel gateway
  b. Origin listening address and port—Describes how the listening TCP port for the origin gateway will be created The Cluster Monitor, as part of forming a group of tunnel gateway servers, elects one specific member of that group to serve as the cluster coordinator. Any server in the group can serve as this role.

In the Cluster Monitor, the process of configuring a new tunnel has the following steps:

1. Cluster coordinator sends a request to the destination gateway server to create the pipe listener block. The pipe listener block will be configured to listen on a random pipe port, and connect to the destination target address—the target server application for the tunnel.
2. The destination gateway server responds with the pipe port on which the listener block is bound.
3. Cluster coordinator sends requests to all origin gateway servers to create TCP listener blocks. The TCP listener blocks are configured to connect to the destination gateway server on the pipe port determined in step (2).

Internally, the Pipe Router and State Machine (FIG. 4) includes:

Socket port map—indexes all pipe router sockets by the local port they are bound to, as well as the remote port, if they are connected. Allows inbound messages to be quickly routed to the appropriate socket for processing.

Route index—Contains a DTLS state machine and UDP communication channel details for each available peer, indexed by the peer's name. Each route provides a method of sending datagrams to a specific peer.

Each socket managed by the Pipe Router and State Machine includes:

Connection state machine—Identifies the state of the connection of a particular socket and determines interpretation of newly-received messages. The socket states precisely follow those outlined for TCP by RFC 793, including:

SynSent—Connection request sent to other side, pending response

SynReceived—Connection request received, response not yet acknowledged

Established—Connection request acknowledged by both sides, neither side has requested the connection be closed FinWait1—Local side has requested connection closure, remote side has not requested closure, nor has acknowledged local closure request FinWait2—Local side has requested connection closure, remote side has not requested closure, but has acknowledged local closure Closing—Local side has requested connection closure, remote side has requested connection closure also, but has not yet acknowledged local closure TimeWait—Both sides have requested connection closure, remote side has acknowledged, but may require retransmission of local acknowledgment CloseWait—Remote side has requested connection closure, local side has sent acknowledgment but has not requested closure LastAck—Remote side has requested connection closure, local side has sent acknowledgment and then requested closure, but has not yet been acknowledged Listening—Socket is open to accept new connection requests Data buffer—Contains outbound data that has not yet been acknowledged by the other side, and inbound data that is received out-of-order.

Transmission state machine—Decides when and how to send locally-originating data to the remote side. Performs: measurement of network capacity and round-trip-time, message loss analysis, transmission throttling, timed retransmission, and connection timeout actions.

The TCP Tunnel Listener Block (FIG. 5a) and Pipe Listener Block (FIG. 5b) components of the Cluster Monitor internally utilize a Tunnel Session component (FIG. 5c). The tunnel session represents an individual established connection, and includes a TCP socket and a Pipe Router socket. A Tunnel Session is created by a listener block for each connection that it accepts on its listening socket, and each listener block contains a set of Tunnel Sessions that it has created. The Tunnel Session component has two main responsibilities:

Forward data received on one socket to the other socket. As data is received from the TCP socket, it is sent to the pipe socket, and vice-versa. This also includes the possibility of quenching reception on one side when the other side is not accepting data as quickly as it is coming in.

Manage end-of-file and socket closure. Either side can initiate a close, and not necessarily at the same time. A closure event received on one socket must be forwarded to the other, and when both sides have completed closure, the tunnel session can be discarded.

The invention facilitates secured communication tunnels between client and server applications using the TCP protocol, including over untrusted public Internet.

In an example scenario is presented a client needing to connect to a server application over TCP. The client application runs on a host attached to an internal network, which is connected to the public Internet through a router that performs Network Address Translation (NAT). Likewise, the server is operated by a cloud hosting provider, and is attached to a different internal network, which is connected to the public Internet through the cloud provider's NAT router. Each NAT router has a single public IPv4 address that is used to communicate on the public Internet. Each NAT router isolates its internal network from the public Internet, but, for certain purposes, allows its single public IPv4 address to be "shared" by any number of hosts attached to the internal network. The NAT router allows TCP and UDP traffic originating from the internal network to be sent to destinations on the public Internet, and to appear to come from the NAT router's public address, by rewriting the IP and TCP headers as messages are routed. Because there is only one address serving a potentially large internal network, there is no possibility of addressing individual hosts on the internal network from the public Internet using IPv4. Typically, NAT routers allow communication from the public Internet to a host in the internal network using static port forwarding, which is described below, and requires special configuration of the NAT router. The current ubiquity of NAT routers makes this example relevant and interesting.

A common method of facilitating a connection from the client to the server application is with the use of a VPN. A VPN creates a route for Internet protocol messages between the internal networks, with the internal addressing of those networks. In the example, to connect, the client requests to connect to 10.0.1.101 (the server's internal IP address), port 8080. The server application observes a connection from the client's internal IP address.

VPNs must integrate with network routing components, in order to provide a route to a subset of Internet protocol addresses, and receive messages from other parts of the network destined to those addresses. A typical VPN will first establish itself as a network route with its local network router. It will then collect network messages that have been routed to a specific Internet Protocol address, and include an Internet Protocol encapsulation (see FIG. 1). Each message is then encapsulated with a security layer for encryption and authentication, such as TLS, and transported to the other side using TCP, UDP, or GRE, depending on the VPN. The VPN component on the other side will decapsulate the original Internet Protocol message and deliver it to its local network router.

VPNs are typically complex to set up and require in-depth knowledge of networking. Avoiding this complexity is one of the primary goals of the invention.

The Internet protocol level addressability provided by VPNs makes them a complete solution for network integration. Applications other than the one server application can be accessed from the client's internal network. Also, applications that use protocols other than TCP can be accessed, and hosts from the server's internal network can address and connect to hosts on the client's internal network. In most situations, this is desirable. In other situations, suppose the client's internal network contains potentially malicious actors, the full connectivity of a VPN is undesirable for security reasons, and must be limited through the addition of a firewall, which adds further complexity.

Figure 6:
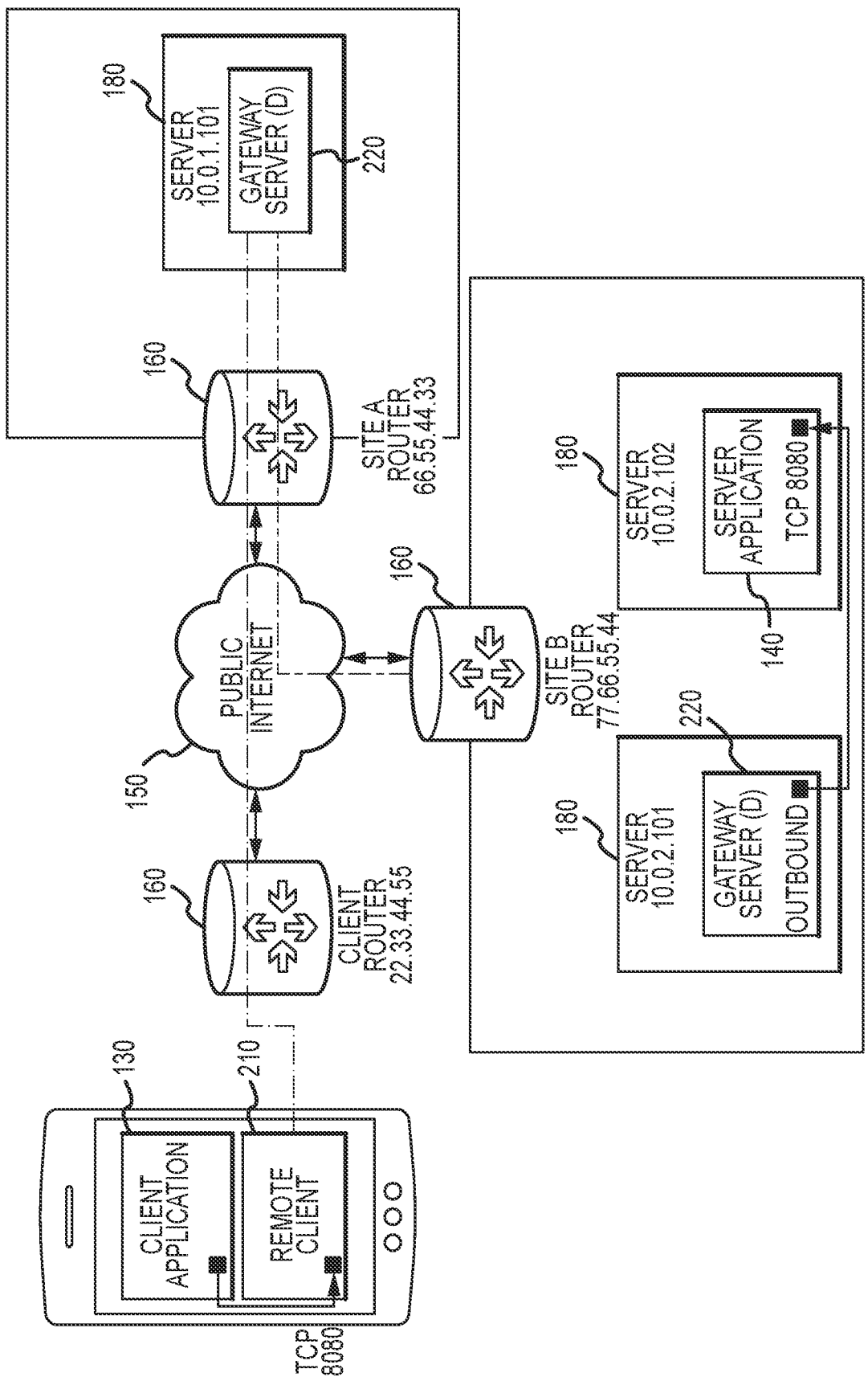
FIG. 6 presents a high level network and component diagram of a TCP application client application redirection to a secondary gateway server according to one embodiment of the present invention.

Another method of facilitating a TCP connection from the client to the server application is through port forwarding (FIG. 6b). Port forwarding is a feature specific to NAT routers, where an external TCP port associated with the router's public Internet address is redirected to a specific internal address and TCP port. To do this, the NAT router must be specifically configured. In the example, to connect, the client requests to connect to 55.66.77.88 (the server NAT router's public IP address), port 8080. The server application observes a connection from 22.33.44.55 (the public Internet address of the client NAT router).

Port forwarding allows the client to connect to the server application. However, it also allows any other host on the public Internet to connect to the server application, which can be a security concern. Some NAT routers allow restrictions on which addresses are allowed to connect to a forwarded port.

TCP connection tunneling (FIG. 6c) as per the invention, provides a greater degree of isolation, by providing the client application with access to the server application and only the server application, without the possibility of access from the public Internet. In the example, the client requests to connect to 10.0.1.201 (The tunnel gateway server), port 8080. The server application observes a connection from 10.1.0.101 (itself, as the destination gateway is operating on the same server).

In addition to restricting access from the public Internet, TCP connection tunneling can also be used to restrict internal network access to the server application. In this situation, the destination gateway must operate on the same server as the server application, and the server application must be configured to open its listening TCP port on the loopback address. This permits only client applications running on the server to connect to the server application, or any client able to connect to the origin gateway side of the tunnel.

Figure 7:
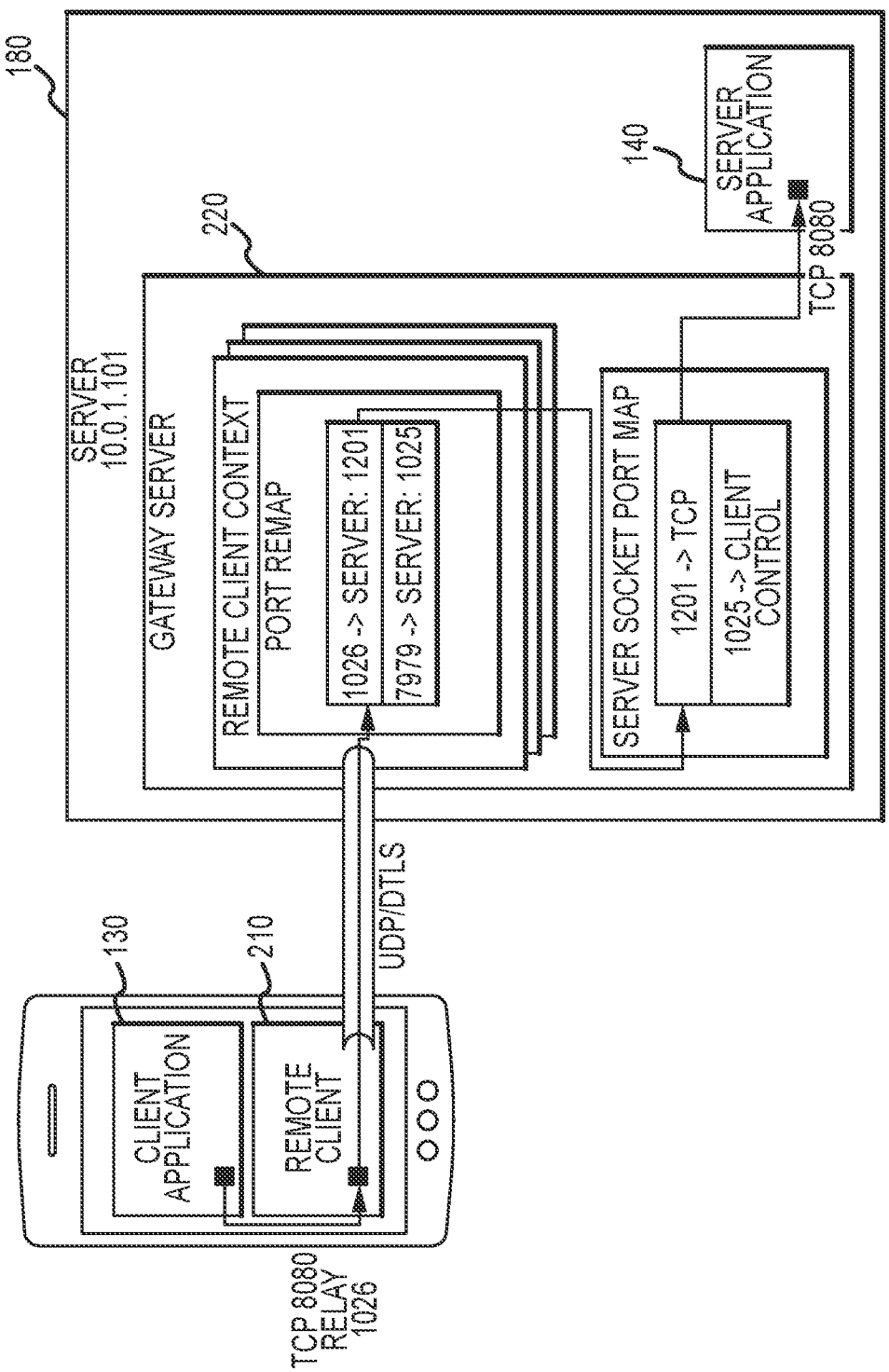
FIG. 7 presents a high level network and component diagram of a TCP application client application as it interacts directly with an application server according to one embodiment of the present invention.
Figure 8:
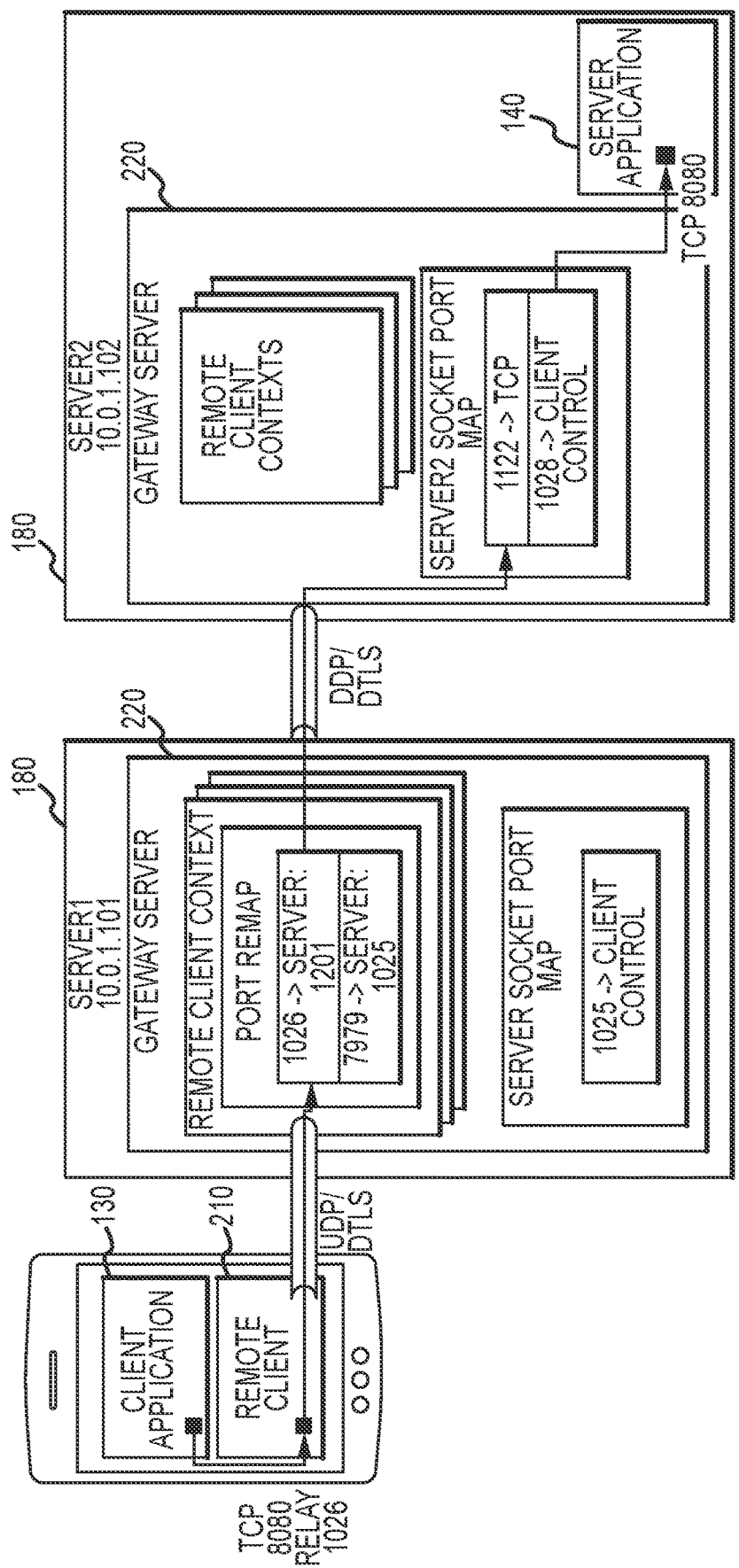
FIG. 8 presents a high level network and component diagram of a TCP application client application as it interacts with an application server through a gateway server according to one embodiment of the present invention.
Figure 9:
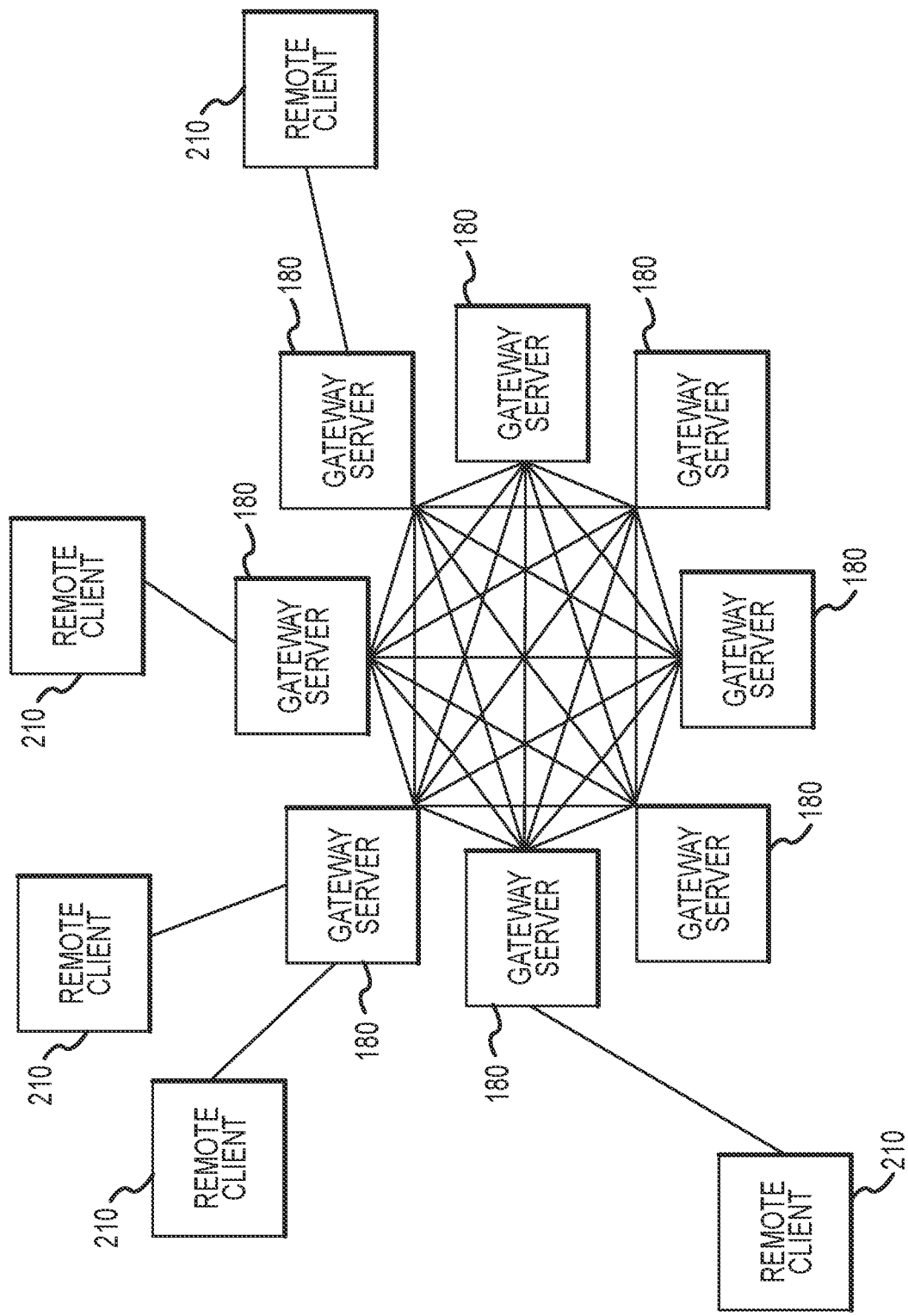
FIG. 9 is a high level network architecture topology of remote client and gateway server interaction, according to one embodiment of the present invention.
Figure 10:
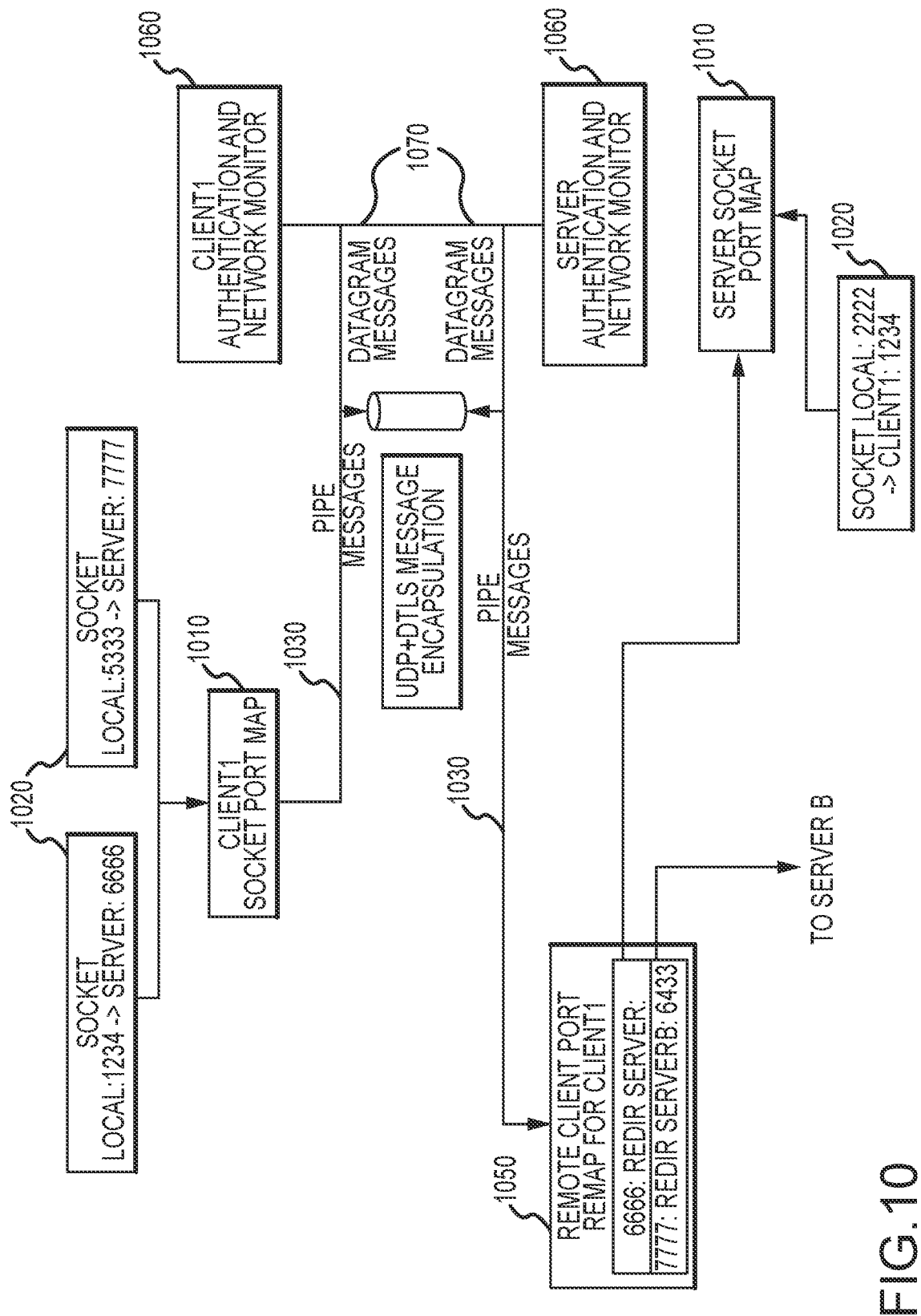
FIG. 10 shows UDP/IP+DTLS communication channel components, according to one embodiment of the present invention.

Compared to a software VPN, the invention behaves much differently. As described above, the example software VPN integrates with a network routing layer by establishing a route for the remote side of the network, and proceeds to collect messages destined to the set of network addresses mapped to the other side. In FIG. 7, this is performed by the VPN Driver component. On Linux, for example, this VPN driver can be PPP, L2TP, or TUN/TAP. The VPN driver collects messages that have been generated by the layer-4 TCP state machine of the host networking stack, and routed by the layer-3 Internet Protocol component of the host networking stack. The messages are processed by a VPN application component, which encapsulates them for security, and transports them to a counterpart VPN application using TCP, UDP, or GRE. The counterpart VPN application decapsulates the messages, and injects them into the VPN driver so that they can be processed by the Internet Protocol layer of the host networking stack.

TCP tunneling, as performed by the invention, does not interact with the host networking stack at any layers below layer-4. The Cluster Monitor component receives application payloads from the client application's TCP session, processes them through its tunnel endpoint manager, pipe state machine, and DTLS state machine components, and transports them to the Cluster Monitor on the other side.

The invention specifies the use of the datagram-oriented UDP protocol for communication between tunnel gateways. The use of TCP as the transport would substantially simplify the design of the invention, but is rejected for two reasons:

Endpoint discovery on NAT routers is substantially more reliable using UDP

UDP allows for more accurate assessment of liveness of peers, as every message received from a peer is processed by a component of the invention, whereas with TCP, the host networking stack will not inform the application of any message that does not contain the next unreceived data block.

The invention specifies the use of a single UDP port for all styles of communication between servers, as well as with the intermediary registry. This supports the goal of reliable endpoint discovery.

The invention is capable of facilitating direct communication between two servers in situations where one server sits behind a symmetric NAT, as long as the other server does not also sit behind a symmetric NAT. This is enabled by bidirectional attempts to initiate communication, where the outbound attempt from the server behind the non-symmetric NAT may be blocked by the symmetric NAT, but the outbound attempt of the server behind the symmetric NAT will not be blocked by the non-symmetric NAT.

Embodiments of the present invention are herein described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

It will be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with a method for TCP tunneling over the Internet, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate claims to such features and/or combinations of such features during the prosecution of the present application or of any further application derived therefrom.

What is claimed is:

1. A computer implemented system for TCP tunneling, the computer system comprising:
   a remote client having a client application with client application data, and a client tunnel gateway module;
   a plurality of servers operating as a server cluster forming an overlay network in which each server of the plurality of servers maintains an active communication channel with every other server of the plurality of servers, and wherein each server includes one of a plurality of server tunnel gateway modules that each include,
      one or more UDP communication sockets wherein each socket mediates connectivity between the client tunnel gateway module and one of the plurality of server tunnel gateway modules, and
      wherein the one of the plurality of server tunnel gateway modules forms a list of available tunnels for the client tunnel gateway module; and
   one or more server applications communicatively coupled with the one of plurality of server tunnel gateway modules wherein responsive to lack of connectivity between the remote client and the one of the plurality of server tunnel gateway modules, the remote client selects any other available server of the plurality of servers in the overlay network reestablishing connectivity to the one or more server applications from the list of available tunnels, and wherein responsive to the remote client connecting with the one of the one or more server gateways, the server gateway tunnel module creates a client context for the remote client, the client context including a port remap table having an entry for each available tunnel, forming the list of available tunnels.

2. The computer implemented system according to claim 1, wherein the client tunnel gateway module opens one or more TCP ports to connect with one or more of the plurality of servers.

3. The computer implemented system according to claim 1, wherein the client tunnel gateway module includes a client TCP listener open for an application tunnel with the client application.

4. The computer implemented system according to claim 3, wherein the application tunnel is mapped to a client tunnel origin associated with the client tunnel gateway.

5. The computer implemented system according to claim 4, further comprising one or more server pipe listeners wherein one of the one or more server pipe listeners includes an open port to connect the client tunnel gateway with the server tunnel gateway.

6. The computer implemented system according to claim 5, further comprising one or more tunnel connections between the client tunnel origin and one or more server tunnel destinations associated with the server tunnel gateway.

7. The computer implemented system according to claim 6, wherein the one or more server tunnel destinations opens a TCP connection with each server application thereby connecting each server application to the client application via one of the one or more tunnel connections.

8. The computer implemented system according to claim 7, wherein the one or more server tunnel destinations may be located on any server within the server cluster, or any server communicatively coupled to any other server within the server cluster.

9. The computer implemented system according to claim 1, wherein each of the one or more server applications includes one or more TCP listening ports to interact with the client application.

10. The computer implemented system according to claim 1, wherein the one or more server applications are each communicatively coupled to the server tunnel gateway module through a direct layer-4 TCP network route.

11. The computer implemented system according to claim 1, further comprising an intermediary registry communicatively coupled to each of the plurality of servers and the remote client wherein the intermediary registry maintains a list of available servers in the server cluster.

12. A method for TCP tunneling, the method comprising:
    establishing a control connection between a remote client and one of a plurality of gateway servers using UDP protocols with DTLS secure encapsulation, wherein the plurality of gateway servers operate as a server cluster forming an overlay network in which each server of the plurality of gateway servers maintains an active communication channel with every other gateway server of the plurality of gateway servers, and;
    receiving, by the remote client from the one of the plurality of gateway servers, a list of available tunnels for connectivity to one or more server applications wherein the list includes for each available tunnel, a tunnel name, a tunnel name pipe port, and a default TCP listener address for the tunnel name; and
    opening, by the remote client, one or more pipe ports forming one or more UDP channels between the remote client and one or more of the plurality of gateway servers, wherein each pipe port corresponds to one of the available tunnels and wherein responsive to lack of connectivity between the remote client and the one of the plurality of gateway servers, the remote client selects any other available server from the server cluster reestablishing connectivity to the one or more server applications from the list of available tunnels, and wherein responsive to establishing the control connection, the server gateway tunnel module creates a client context for the remote client, the client context including a port remap table having an entry for each available tunnel, forming the list of available tunnels.

13. The method according to claim 12, wherein establishing includes discovering, by the remote client, an undiscovered UDP endpoint for each gateway server.

14. The method according to claim 13, further comprising initiating, by the remote client, a DTLS handshake with the discovered endpoint for each gateway server.

15. The method according to claim 14, further comprising authenticating, by the remote client, each gateway server based on a public key presented during DTLS handshaking via a datagram message and wherein responsive to successful authentication of the remote client by each gateway server, further comprising opening, by each gateway server, a pipe port to the remote client.

16. The method according to claim 15, further comprising opening, by the remote client, a pipe connection to the pipe port establishing the control connection.

17. The method according to claim 12, wherein ascertaining includes sending, by the remote client through the control connection an authorization request for access to one or more tunnels.

18. The method according to claim 17, further comprising confirming tunnel availability by ascertaining current tunnel access session counts by an authenticated user and wherein responsive to confirming tunnel availability, further comprising mapping each authorized tunnel for the remote client to a unique pipe port.

19. The method according to claim 12, further comprising sending, by the remote client to the gateway server, a tunnel confirmation request through the control connection.

* * * * *